(12) United States Patent
Maeng et al.

(10) Patent No.: US 12,235,672 B2
(45) Date of Patent: Feb. 25, 2025

(54) APPARATUSES AND METHODS FOR TIMING SKEW CALIBRATION

(71) Applicant: Samsung Electronics Co., Ltd., Suwon-si (KR)

(72) Inventors: Junyoung Maeng, Suwon-si (KR); Jaewoo Park, Suwon-si (KR); Myoungbo Kwak, Suwon-si (KR); Junghwan Choi, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 68 days.

(21) Appl. No.: 18/363,906

(22) Filed: Aug. 2, 2023

(65) Prior Publication Data
US 2024/0176385 A1    May 30, 2024

(30) Foreign Application Priority Data

Nov. 28, 2022  (KR) .......................... 10-2022-0162034

(51) Int. Cl.
  *G06F 1/10*   (2006.01)
(52) U.S. Cl.
  CPC ...................................... *G06F 1/10* (2013.01)
(58) Field of Classification Search
  CPC ........................................................ G06F 1/10
  See application file for complete search history.

(56) References Cited

U.S. PATENT DOCUMENTS

| | | | | |
|---|---|---|---|---|
| 7,787,995 | B2 * | 8/2010 | Chen .......................... | H02J 3/00 340/657 |
| 8,122,278 | B2 * | 2/2012 | Salam ........................ | G06F 1/10 713/503 |
| 8,604,954 | B2 | 12/2013 | Chen et al. | |
| 8,659,454 | B2 | 2/2014 | Sugimoto et al. | |
| 9,608,652 | B2 | 3/2017 | Lee et al. | |
| 10,425,219 | B2 | 9/2019 | Lim | |
| 11,043,956 | B1 | 6/2021 | Wan et al. | |
| 2002/0126352 | A1 * | 9/2002 | Shake .............. | H04B 10/07953 398/81 |
| 2007/0213878 | A1 * | 9/2007 | Chen ......................... | H02J 3/00 700/291 |
| 2016/0079994 | A1 * | 3/2016 | Lee .......................... | H03M 1/46 341/118 |
| 2016/0134267 | A1 * | 5/2016 | Adachi .................. | H03K 5/156 327/237 |
| 2019/0173480 | A1 | 6/2019 | Ryu et al. | |

FOREIGN PATENT DOCUMENTS

| | | |
|---|---|---|
| CN | 114448441 A | 5/2022 |
| CN | 113328751 B | 6/2022 |

\* cited by examiner

*Primary Examiner* — Phil K Nguyen
(74) *Attorney, Agent, or Firm* — Myers Bigel, P.A.

(57) ABSTRACT

An apparatus and method for timing skew calibration. For example, the apparatus may include an analog-to-digital conversion circuit configured to sample an input signal based on a clock signal and convert the sampled input signal into a digital code, a skew detection circuit configured to calculate a first sum of standard deviations for respective levels of the digital code, compare the first sum of the standard deviations with a previously calculated second sum of standard deviations, and select a smaller value from among the first sum and the second sum, and a compensation circuit configured to compensate for a skew of the clock signal based on the selected one of the first sum and the second sum.

20 Claims, 12 Drawing Sheets

APPARATUSES AND METHODS FOR TIMING SKEW CALIBRATION

CROSS-REFERENCE TO RELATED APPLICATION

This application is based on and claims priority under 35 U.S.C. § 119 to Korean Patent Application No. 10-2022-0162034, filed on Nov. 28, 2022, in the Korean Intellectual Property Office, and the entire contents of the above-identified application are incorporated by reference herein.

BACKGROUND

The present disclosure relates to apparatuses and methods for calibrating clock skew.

A time-interleaved analog-to-digital converter (TIADC) is a type of high-speed analog-to-digital converter (ADC). A TIADC may increase a sampling rate of an analog signal by using parallel-connected ADCs and a multiplexer (MUX). However, methods for adjusting channel mismatch for a TIADC are increasingly desired. In particular, a method of calibrating a clock skew of a TIADC is increasingly desired.

SUMMARY

The present disclosure provides methods and apparatus for calibrating a clock skew, for example a clock skew of a time-interleaved analog-to-digital converter (TIADC).

According to some aspects of the inventive concepts, there is provided an apparatus including an analog-to-digital conversion circuit configured to sample an input signal based on a clock signal and configured to convert the sampled input signal into a digital code, a skew detection circuit configured to receive the digital code from the analog-to-digital conversion circuit, calculate a first sum of standard deviations for respective levels of the digital code, compare the first sum of the standard deviations with a previously calculated second sum of standard deviations, and select a smaller value from among the first sum and the second sum, and a compensation circuit configured to compensate for a skew of the clock signal based on the selected smaller value from among the first sum and the second sum.

According to some aspects of the inventive concepts, there is provided an apparatus including an analog-to-digital conversion circuit configured to sample an input signal based on a clock signal and convert the sampled input signal into a digital code, a skew detection circuit configured to receive the digital code from the analog-to-digital conversion circuit, calculate a first sum of variances for respective levels of the digital code, compare the first sum of the variances with a previously calculated second sum of variances, and select a smaller value from among the first sum and the second sum, and a compensation circuit configured to compensate for a skew of the clock signal based on the selected smaller value from among the first sum and the second sum.

According to some aspects of the inventive concepts, there is provided an apparatus including a time interleaved analog-to-digital converter (TIADC) including at least one switch that is configured to sample an input signal based on a clock signal and one or more analog-to-digital converter (ADC) that is configured to convert a sampled input signal into a digital code, a sigma monitor configured to calculate a first sum of standard deviations for respective levels of the digital code, a decision logic configured to receive the first sum of the standard deviations from the sigma monitor, compare the first sum of the standard deviations with a previously calculated second sum of standard deviations, and select a smaller value from among the first sum and the second sum, and a compensation circuit configured to compensate for a skew of the clock signal based on the selected smaller value from among the first sum and the second sum.

BRIEF DESCRIPTION OF THE DRAWINGS

Embodiments of the inventive concept will be more clearly understood from the following detailed description taken in conjunction with the accompanying drawings in which.

DETAILED DESCRIPTION

Figure 1A:
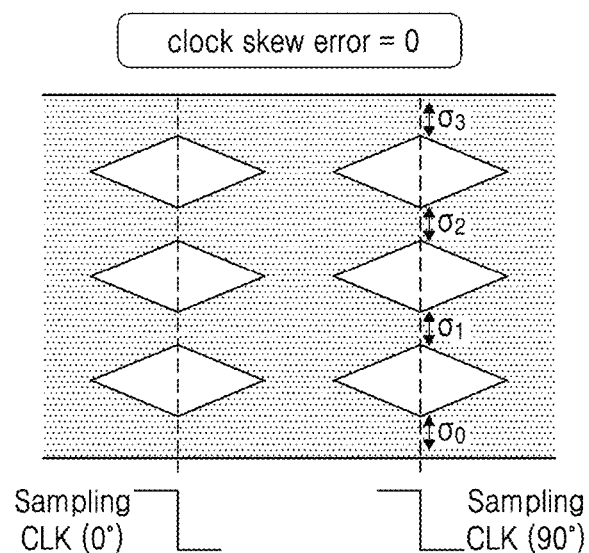
FIG. 1A shows a standard deviation for each data level when there is no clock skew.
Figure 1B:
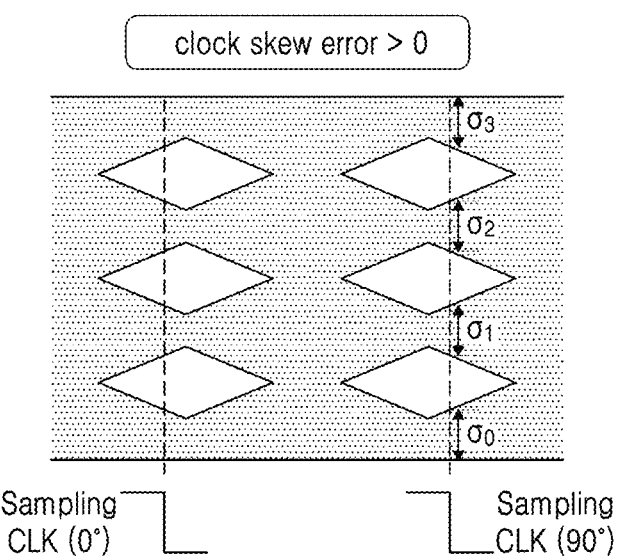
FIGS. 1B and 1C show standard deviations for each data level when there is a clock skew.
Figure 1C:
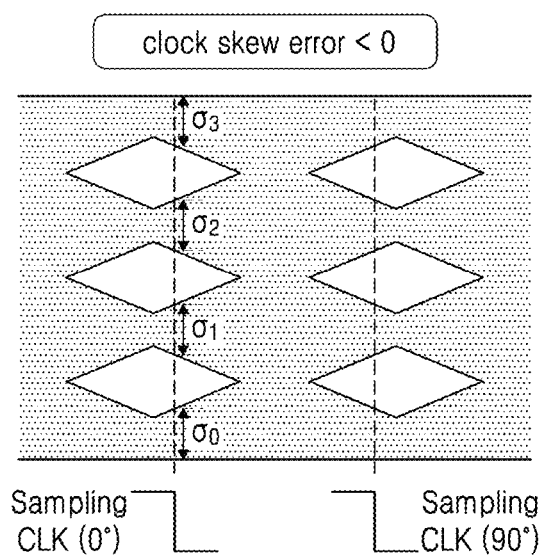

FIG. 1A shows a standard deviation for each data level when there is no clock skew. FIGS. 1B and 1C show standard deviations for each data level when there is a clock skew.

A skew between multi-phase clock signals in an analog-to-digital converter (ADC)-digital signal processor (DSP)-based high-speed receiver may cause deterioration (e.g., direct deterioration) of a performance index of a time-interleaved analog-to-digital converter (TIADC). For example, a clock skew may cause deterioration of a performance index that is based on or includes at least one of an error number of bits (ENOB) and a signal-to-noise ratio (SNR). A sampling clock skew of a TIADC may need to be managed, and may need to be managed continuously, in order to achieve a target bit error rate (BER).

Referring to FIGS. 1A, 1B, and 1C, sampled data may have a distribution for each level. In FIGS. 1A, 1B, and 1C, it is assumed that a data signal is pulse-amplitude modulation (PAM) 4 signaling. Referring to FIG. 1A, when there is no clock skew error, a falling edge sampled by each clock signal may be located in the center of data. Furthermore, each data level may have the smallest standard deviation and the largest eye height. In other words, standard deviations $\sigma_0$, $\sigma_1$, $\sigma_2$, and $\sigma_3$ for respective data levels may have minimum values. For example, data of the lowest level may have a standard deviation of $\sigma_0$, data of the second lowest level may have a standard deviation of $\sigma_1$, data of the third lowest level may have a standard deviation of $\sigma_2$, and data of the highest level of data may have a standard deviation of $\sigma_3$, wherein these standard deviations may each have the minimum value.

Referring to FIG. 1B, when a clock skew error is a positive number, data may be sampled at a point out of the center of data. In greater detail, data sampled at a phase of 0 degrees may be sampled on the left side from the center of data, and data sampled at a phase of 90 degrees may be sampled on the right side from the center of the data. In this case, standard deviations $\sigma_0$, $\sigma_1$, $\sigma_2$, and $\sigma_3$ for respective levels of data may increase as compared to the case where there is no clock skew error.

Referring to FIG. 1C, when a clock skew error is a negative number, data may be sampled at a point out of the center of data. In greater detail, data sampled at a phase of 0 degrees may be sampled on the right side from the center of data, and data sampled at a phase of 90 degrees may be sampled on the left side from the center of the data. In this case, standard deviations $\sigma_0$, $\sigma_1$, $\sigma_2$, and $\sigma_3$ for respective levels of data may increase as compared to the case where there is no clock skew error.

In other words, when there is a clock skew, the standard deviation (or variance) for each level of sampled data may increase as compared to a case where there is no clock skew. Therefore, the present disclosure proposes a method of detecting and compensating for a clock skew using the characteristic in which a standard deviation (or variance) of sampled data increases when there is a clock skew.

Timing calibration devices according to some embodiments may adjust a clock skew by using information regarding standard deviation (or variance) for each level of sampled data. In other words, timing calibration devices according to some embodiments may adjust a sampling point of a clock signal to be located at the center of data distribution by using sampled output data, as shown in FIG. 1A. Therefore, performance of a time-interleaved analog-to-digital converter (TIADC) may be improved. Also, timing calibration devices according to some embodiments may calibrate (e.g., may calibrate more precisely) a clock skew by performing clock calibration based on a sampled digital signal, instead of clock-based clock calibration.

Since a timing calibration apparatus according to the present disclosure does not need a reference ADC (and may therefore omit such a reference ADC), a power consumption thereof may be reduced. Also, dependence on or due to variation of a reference ADC may be reduced.

Figure 2:
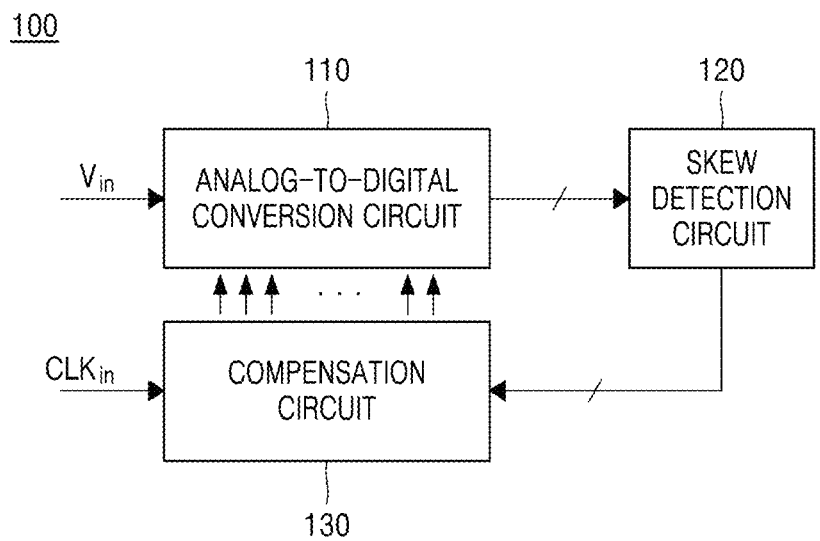
FIG. 2 is a diagram showing an example of a timing calibration device according to some embodiments.

FIG. 2 is a diagram showing an example of a timing calibration device according to some embodiments.

Referring to FIG. 2, a timing calibration device 100 may include an analog-to-digital conversion circuit 110, a skew detection circuit 120, and a compensation circuit 130. The analog-to-digital conversion circuit 110 may receive an input signal Vin as an input. The input signal Vin may be an analog data signal. The analog-to-digital conversion circuit 110 may perform sampling on the input signal Vin. The analog-to-digital conversion circuit 110 may convert a sampled signal into a digital code. The digital code may have one or more levels. In greater detail, digital code values having one or more levels may have a distribution due to a reason like InterSymbol Interference (ISI).

The skew detection circuit 120 may monitor statistics of digital code values having a distribution. The skew detection circuit 120 may detect a clock skew by using a standard deviation value regarding a voltage level of sampled data.

For example, the skew detection circuit 120 may calculate the sum of standard deviations of respective levels of a digital code. For example, when a digital code has four levels 00, 01, 10, and 11, the skew detection circuit 120 may calculate a standard deviation for a level 00, a standard deviation for a level 01, a standard deviation for a level 10, and a standard deviation for a level 11, and may calculate the sum of the standard deviations by summing all of calculated standard deviations.

For example, the skew detection circuit 120 may calculate the sum of variances of respective levels of a digital code. For example, when a digital code has four levels 00, 01, 10, and 11, the skew detection circuit 120 may calculate a variance for a level 00, a variance for a level 01, a variance for a level 10, and a variance for a level 11, and may calculate the sum of the variances by summing all of calculated variances.

The skew detection circuit 120 may compare the sum of standard deviations with a previously calculated sum of standard deviations and may select a smaller value between the presently calculated sum and the previously calculated sum. For example, the skew detection circuit 120 may compare the sum of standard deviations of respective levels of a digital code with a sum of standard deviations calculated immediately before and select a smaller value from among the presently calculated sum and the sum calculated previously.

In another example, the skew detection circuit 120 may calculate standard deviations for a plurality of number of times during a certain time period based on randomness of data. Therefore, the skew detection circuit 120 may compare the sum of standard deviations of respective levels of a digital code with sums of standard deviations calculated for a certain period of time and may select the smallest value from among sums of a plurality of standard deviations.

The compensation circuit 130 may compensate for a skew of a clock signal $CLK_{IN}$ used for sampling based on a selected standard deviation value. For example, the compensation circuit 130 may compensate for the skew by delaying a clock signal. In other words, the compensation circuit 130 may operate as a digitally-controlled delay line (DCDL).

In another example, the compensation circuit 130 may compensate for a skew by interpolating a clock signal. In other words, the compensation circuit 130 may operate as a phase interpolator.

The compensation circuit 130 may receive parameters regarding clock skew calibration based on a standard deviation selected by the skew detection circuit 120. Then, the compensation circuit 130 may compensate for a skew of a clock signal used for sampling based on standard deviations for respective levels of sampled data.

The analog-to-digital conversion circuit 110 may further include a multiplexer (not shown) that is configured to serialize digital codes. The analog-to-digital conversion circuit 110 may further include a slicer (not shown) that is configured to divide a serialized code by level and transmit a level-divided code to the skew detection circuit 120. The multiplexer (not shown) and the slicer (not shown) may be included in the analog-to-digital conversion circuit 110 or may be located outside the analog-to-digital conversion circuit 110 as in the embodiment of FIG. 3.

Figure 3:
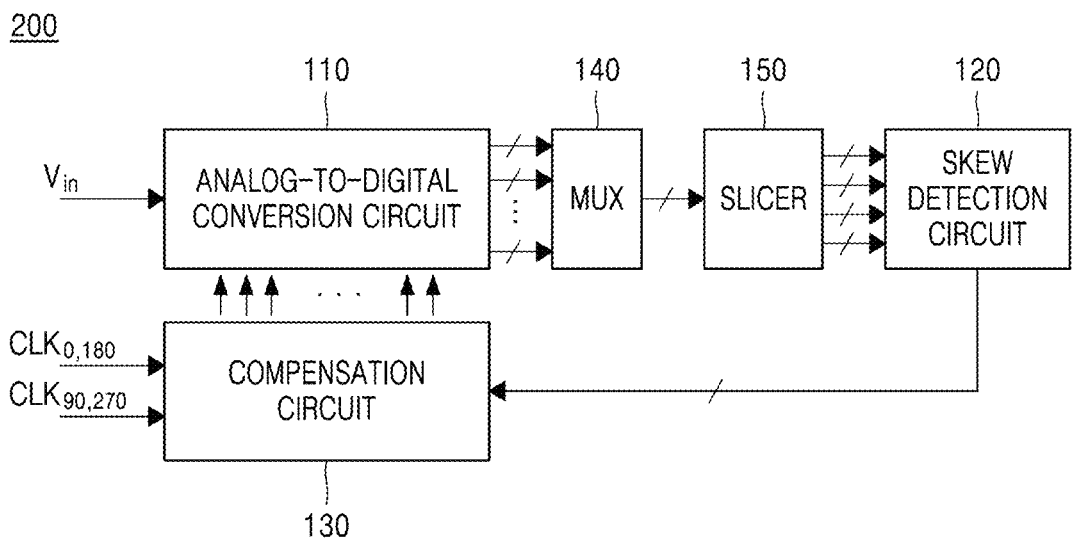
FIG. 3 is a diagram showing an example of a timing calibration device according to some embodiments.

FIG. 3 is a diagram showing an example of a timing calibration device according to some embodiments.

Referring to FIG. 3, a timing calibration device 200 may include the analog-to-digital conversion circuit 110, the skew detection circuit 120, the compensation circuit 130, a multiplexer (MUX) 240, and a slicer 250. The analog-to-digital conversion circuit 110, the skew detection circuit 120, and the compensation circuit 130 may be the same as those described above in FIG. 2, and descriptions thereof are omitted here in favor of the previously provided description in the interest of brevity.

The MUX 240 may receive a digital code from the analog-to-digital conversion circuit 110 and may serialize the digital code.

The slicer 250 may determine whether data converted into a digital code is low or high. For example, in the case of PAM-4, four data levels 00, 01, 10, and 11 may exist, and the slicer 250 may have four outputs as shown in FIG. 3. Data may have various numbers of levels and is not limited to the above-stated embodiments and/or number of levels.

The slicer 250 may receive a serialized code from the MUX 240, may divide the serialized code by levels, and may transmit the level-divided code to the skew detection circuit 120.

The skew detection circuit 120 may transmit a skew calibration code to the compensation circuit 130. The compensation circuit 130 may compensate for a clock skew based on the skew calibration code. For example, the compensation circuit 130 may compensate for skews of clock signals $CLK_{0, 180}$ and $CLK_{90, 270}$ based on the skew calibration code. $CLK_{0, 180}$ may include $CLK_0$ and $CLK_{180}$. $CLK_{90, 270}$ may include $CLK_{90}$ and $CLK_{270}$. The analog-to-digital conversion circuit 110 may sample the input signal Vi, based on compensated clock signals $CLK_{0, 180}$ and $CLK_{90, 270}$.

Figure 4:
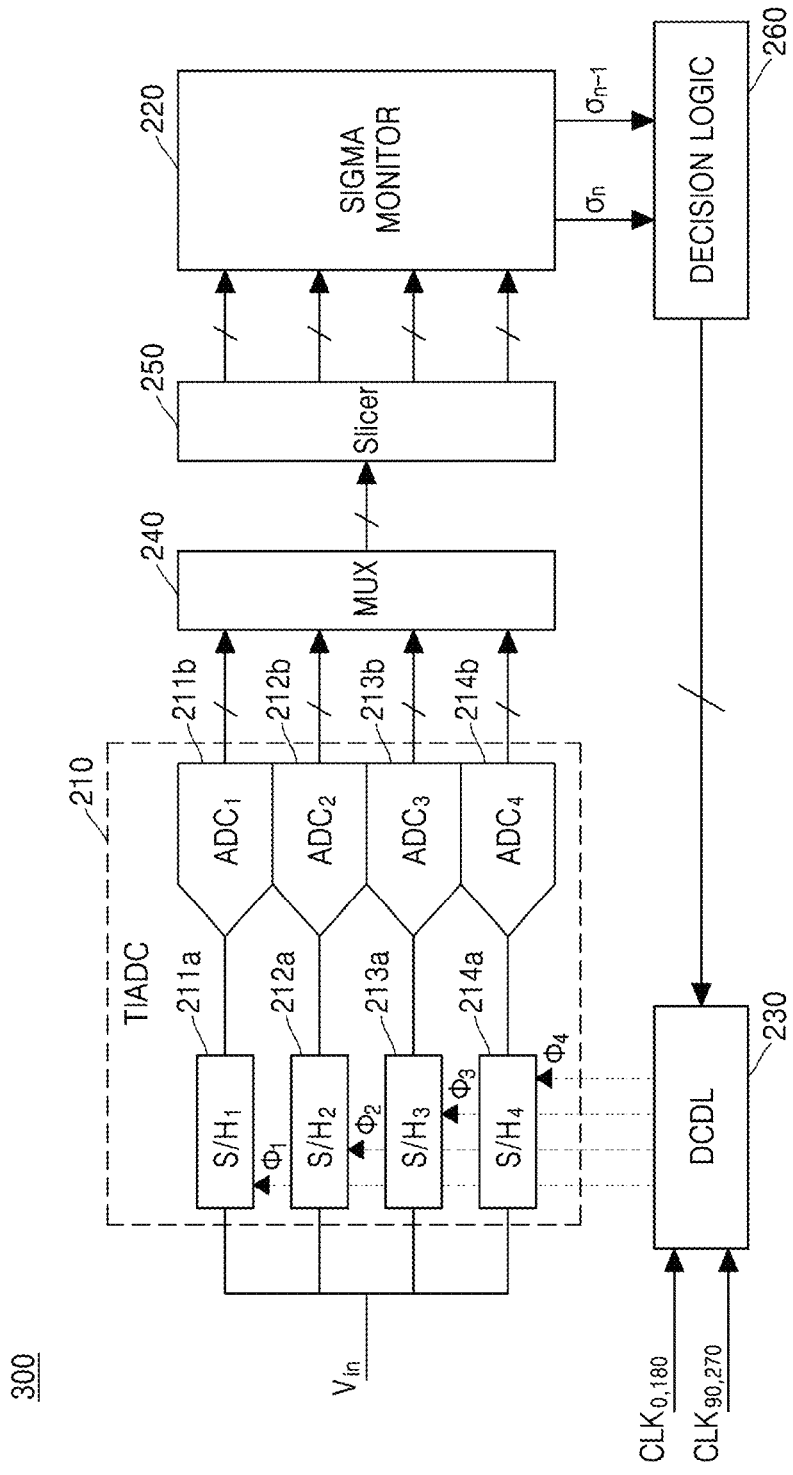
FIG. 4 is a diagram showing an example of a timing calibration device according to some embodiments.

FIG. 4 is a diagram showing an example of a timing calibration device according to some embodiments. FIG. 4 may be described with reference to FIGS. 2 and 3.

Referring to FIG. 4, a timing calibration apparatus 300 may include a time-interleaved analog-to-digital converter (TIADC) 210, the MUX 240, the slicer 250, a sigma monitor 220, a decision logic 260, and a digitally controlled delay line (DCDL) 230. The timing calibration device 300 will be described under an assumption that PAM-4 signaling is performed.

For example, referring to FIGS. 2 and 3, the analog-to-digital conversion circuit 110 may include the TIADC 210 and the MUX 240, the skew detection circuit 120 may include the slicer 250, the sigma monitor 220, and the decision logic 260, and the compensation circuit 130 may include the DCDL 230.

The TIADC 210 may include four sample and hold switches 211a, 212a, 213a, and 214a and four analog-to-digital converters (ADCs) 211b, 212b, 213b, and 214b. The TIADC 210 may include various numbers of sample and hold switches and various numbers of ADCs, and the number of sample and hold switches and the number of ADCs are not limited to four in the above-stated embodiments.

The TIADC 210 may sample the input signal Vin. In greater detail, the sample and hold switches 211a, 212a, 213a, and 214a may sample the input signal Vin. The sample and hold switches 211a, 212a, 213a, and 214a may operate in synchronization with clock signals $CLK_0$, $CLK_{90}$, $CLK_{180}$, and $CLK_{270}$, respectively. $CLK_{0, 180}$ may include $CLK_0$ and $CLK_{180}$. $CLK_{90, 270}$ may include $CLK_{90}$ and $CLK_{270}$. For example, a sample and hold switch 211a may sample the input signal Vin at $CLK_0(\Phi 1)$. A sample and hold switch 211c may sample the input signal Vin at $CLK_{90}(\Phi 2)$. A sample and hold switch 211b may sample the input signal Vin at $CLK_{180}(\Phi 3)$. A sample and hold switch 211d may sample the input signal Vin at $CLK_{270}(\Phi 4)$. The phase of each of $CLK_0(\Phi 1)$, $CLK_{90}(\Phi 2)$, $CLK_{180}(\Phi 3)$ and $CLK_{270}(\Phi 4)$ may be delayed by the DCDL 230 in response to a skew calibration code. Data sampled by the four sample and hold switches 211a, 212a, 213a, and 214a may be input to the four ADCs 211b, 212b, 213b, and 214b, respectively.

The four ADCs 211b, 212b, 213b, and 214b may convert sampled data into digital signals, respectively. Each of the four ADCs 211b, 212b, 213b, and 214b may input a converted digital signal to the MUX 240. The MUX 240 may serialize an input digital signal. The MUX 240 may input a serialized digital signal to the slicer 250, and the slicer 250 may divide an input digital signal by levels. For example, in the case of PAM-4, the slicer 250 may divide a digital signal into four levels 00, 01, 10, and 11. Data may have various numbers of levels and is not limited to the above-stated embodiments and/or number of levels. The slicer 250 may input a digital signal value for each level to the sigma monitor 220.

The sigma monitor 220 may monitor statistics of digital codes for respective levels. In greater detail, the sigma monitor 220 may obtain a standard deviation or variance of digital codes for each level and may sum all standard deviations or variances of respective levels. The sigma monitor 220 may determine a skew state of a clock signal based on the sum of the standard deviations of the respective levels of the digital signal. The sum of the standard deviations of respective levels of the digital signal may be referred to as a total standard deviation.

The sigma monitor 220 may transmit the total standard deviation $\sigma_{n-1}$ of a previous clock signal to the decision logic 260 at the previous clock signal. The sigma monitor 220 may transmit the total standard deviation $\sigma_n$ of a current clock signal to the decision logic 260. The decision logic 260 may compare the total standard deviation $\sigma_{n-1}$ of the previous clock signal with the total standard deviation $\sigma_n$ of the current clock signal and set a skew calibration code value corresponding to a smaller value. The decision logic 260 may transmit a skew calibration code to the DCDL 230.

The DCDL 230 may delay each of clock signals $CLK_0$, $CLK_{90}$, $CLK_{180}$, and $CLK_{270}$ based on the skew calibration code. $CLK_{0, 180}$ may include $CLK_0$ and $CLK_{180}$. $CLK_{90, 270}$ may include $CLK_{90}$ and $CLK_{270}$. The sample and hold switches 211a, 212a, 213a, and 214a may sample an input signal in synchronization with delayed clock signals $CLK_0$, $CLK_{90}$, $CLK_{180}$, and $CLK_{270}$, respectively.

Since the timing calibration apparatus 100 according to the inventive concept may compensate for a skew based on data sampled through the TIADC 210, a reference for defining a timing skew may not be needed. Since the timing calibration apparatus 100 according to the inventive concept does not need a reference ADC, a power consumption thereof may be reduced. Also, dependence due to variation of a reference ADC may be reduced.

Figure 5:
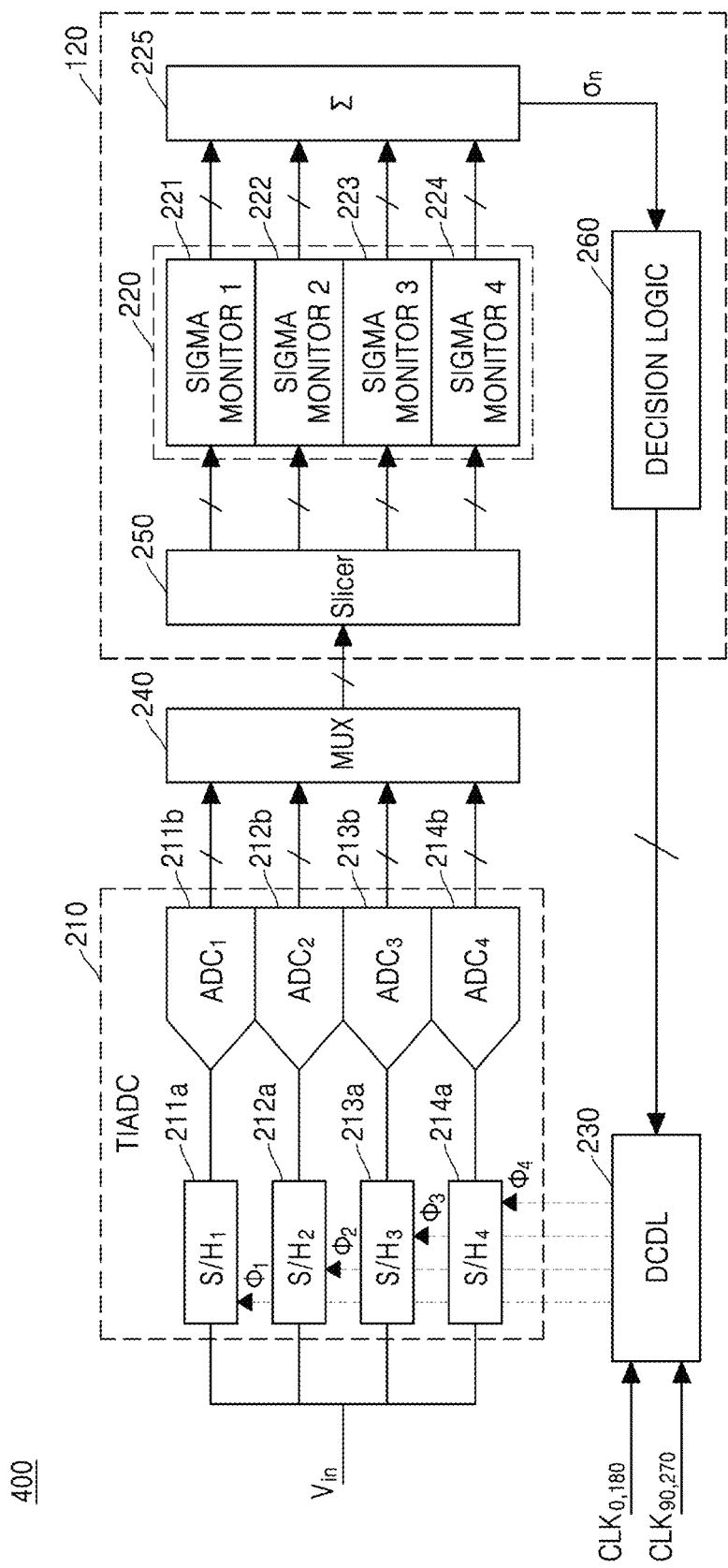
FIG. 5 is a diagram showing an example of a timing calibration device according to some embodiments.

FIG. 5 is a diagram showing an example of a timing calibration device according to some embodiments. FIG. 5 may be described with reference to FIGS. 2 and 3.

Referring to FIG. 5, a timing calibration device 400 may include the TIADC 210, the MUX 240, the slicer 250, sigma monitors 221, 222, 223, and 224, the decision logic 260, and the DCDL 230. The number of the sigma monitors 221, 222, 223, and 224 is not limited to four as in the above-stated embodiment and may vary.

For example, referring to FIGS. 2 and 3, the timing calibration device 400 may include the analog-to-digital conversion circuit 110, the skew detection circuit 120, and the compensation circuit 130. The analog-to-digital conversion circuit 110 may include the TIADC 210 and the multiplexer MUX 240, the skew detection circuit 120 may include the slicer 250, the sigma monitors 221, 222, 223, and 224, a sigma combiner 225, and the decision logic 260, and the compensation circuit 130 may include the DCDL 230.

The sigma monitor 220 may include a plurality of sigma monitors 221, 222, 223, and 224. The plurality of sigma monitors 221, 222, 223, and 224 may each receive one level from among four levels of a digital signal from the slicer 250. In other words, after the slicer 250 divides a digital signals by levels, the slicer 250 may input digital signals corresponding to respective levels to the sigma monitors 221, 222, 223, and 224, respectively. For example, in the case of PAM-4, four data levels 00, 01, 10, and 11 may exist, and the slicer 250 may have four outputs as shown in FIG. 5. Data may have various numbers of levels and is not limited to the above-stated embodiments and/or numbers of levels.

The sigma monitors 221, 222, 223, and 224 may each monitor a standard deviation of an input digital signal for a certain period of time. The sigma monitors 221, 222, 223, and 224 may each input a standard deviations monitored for a certain period of time to the sigma combiner 225. The sigma combiner 225 may calculate a total standard deviation by summing all of standard deviations input by the sigma monitors 221, 222, 223, and 224. The sigma combiner 225 may transmit a total standard deviation $\sigma_n$ to the decision logic 260. The decision logic 260 may compare the total standard deviation $\sigma_n$ of the current clock signal with the total standard deviation (not shown) of the previous clock signal received at the previous clock signal and may generate a skew calibration code corresponding to a smaller value. The decision logic 260 may transmit the skew calibration code to the DCDL 230, and the DCDL 230 may delay a clock signal based on the skew calibration code based on the standard deviation.

The TIADC 210 may include four sample and hold switches 211a, 212a, 213a, and 214a and four analog-to-digital converters (ADCs) 211b, 212b, 213b, and 214b. The TIADC 210 may include various numbers of sample and hold switches and various numbers of ADCs, and the number of sample and hold switches and the number of ADCs are not limited to four in the above-stated embodiments.

Figure 6:
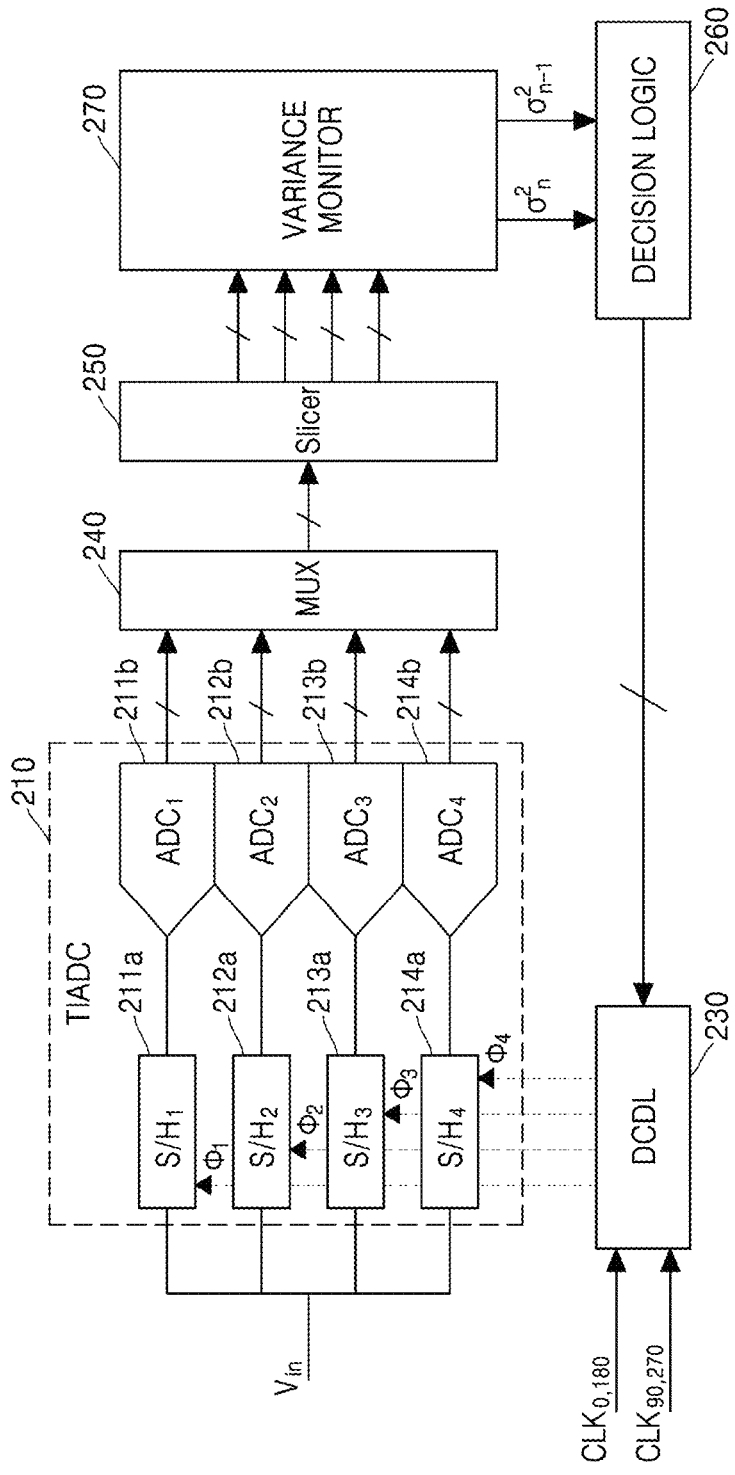
FIG. 6 is a diagram showing an example of a timing calibration device according to some embodiments.

FIG. 6 is a diagram showing an example of a timing calibration device according to some embodiments. FIG. 6 may be described with reference to FIGS. 2 and 3.

Referring to FIG. 6, a timing calibration device 500 may include the TIADC 210, the MUX 240, the slicer 250, a variance monitor 270, the decision logic 260, and the DCDL 230.

For example, referring to FIGS. 2 and 3, the timing calibration device 500 may include the analog-to-digital conversion circuit 110, the skew detection circuit 120, and the compensation circuit 130. The analog-to-digital conversion circuit 110 may include the TIADC 210 and the multiplexer MUX 240, the skew detection circuit 120 may include the slicer 250, the variance monitor 270, the sigma combiner 225, and the decision logic 260, and the compensation circuit 130 may include the DCDL 230.

The variance monitor 270 may calculate the variance for each level of a digital signal received from the slicer 250. Next, the variance monitor 270 may calculate a total variance by summing all of variances for respective levels of the digital signal. The variance monitor 270 may input a total variance $\sigma^2_{n-1}$ calculated for a certain period of time at a previous clock signal to the decision logic 260. Then, the variance monitor 270 may input a total dispersion $\sigma^2_n$ calculated for a certain period of time at a current clock signal to the decision logic 260. The decision logic 260 may compare the total variance $\sigma^2_n$ of the current clock signal with the total variance $\sigma^2_{n-1}$ of the previous clock signal and may select a smaller value. The decision logic 260 may generate a skew calibration code corresponding to a smaller total variance and transmit the skew calibration code to the DCDL 230. The DCDL 230 may compensate for a clock signal based on the skew calibration code that is based on the variance.

Figure 7:
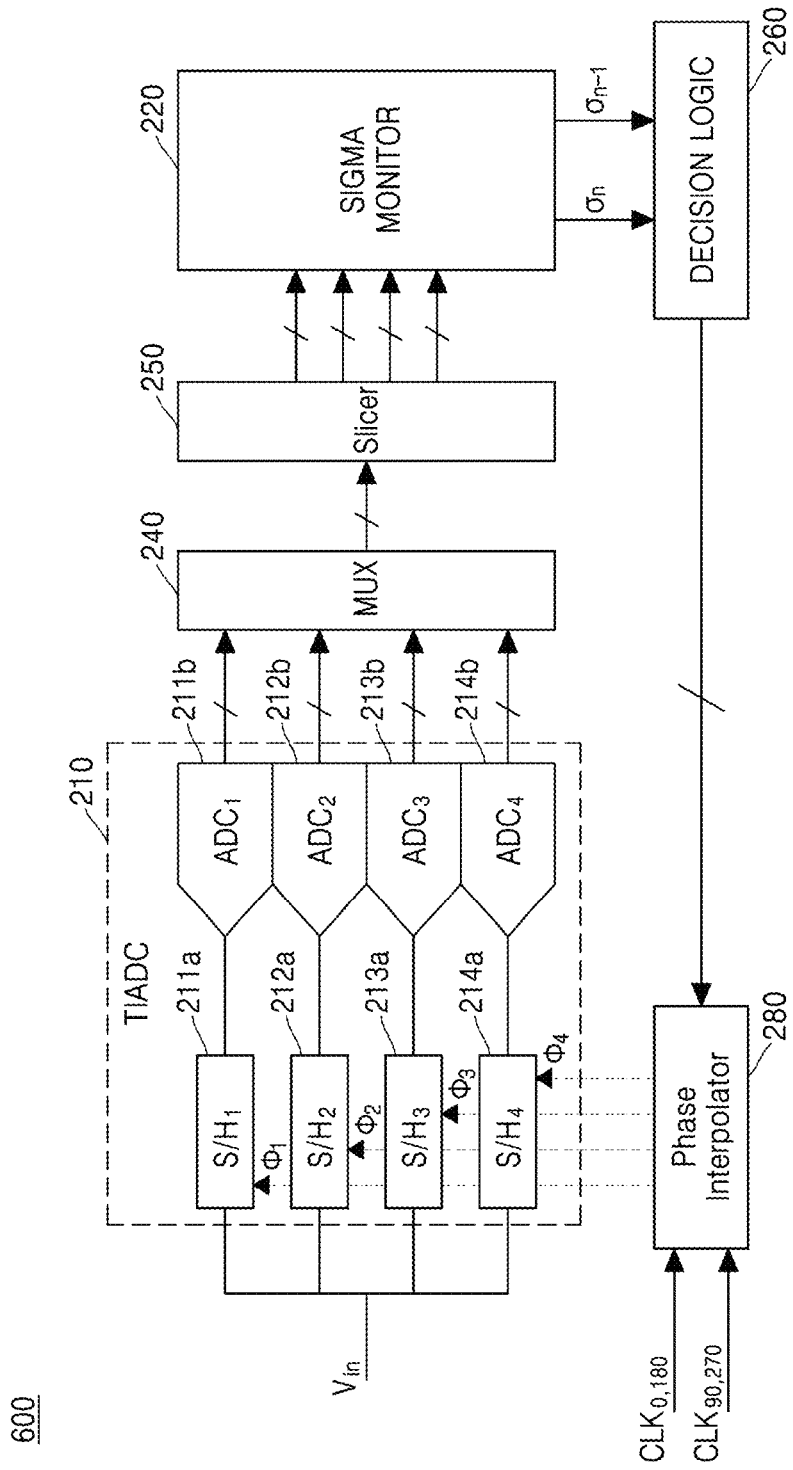
FIG. 7 is a diagram showing an example of a timing calibration device according to some embodiments.

FIG. 7 is a diagram showing an example of a timing calibration device according to some embodiments. FIG. 7 may be described with reference to FIGS. 2 and 3.

Referring to FIG. 7, a timing calibration device 600 may include the TIADC 210, the MUX 240, the slicer 250, the sigma monitor 220, the decision logic 260, and a phase interpolator 280.

For example, referring to FIGS. 2 and 3, the timing calibration device 600 may include the analog-to-digital conversion circuit 110, the skew detection circuit 120, and the compensation circuit 130. The analog-to-digital conversion circuit 110 may include the TIADC 210 and the multiplexer MUX 240, the skew detection circuit 120 may include the slicer 250, the sigma monitor 220, and the decision logic 260, and the compensation circuit 130 may include the phase interpolator 280.

The phase interpolator 280 may receive a skew calibration code from the decision logic 260. The phase interpolator 280 may compensate for skews of clock signals by performing interpolation on clock signals $CLK_0$, $CLK_{90}$, $CLK_{180}$, and $CLK_{270}$ based on the skew calibration code.

Figure 8:
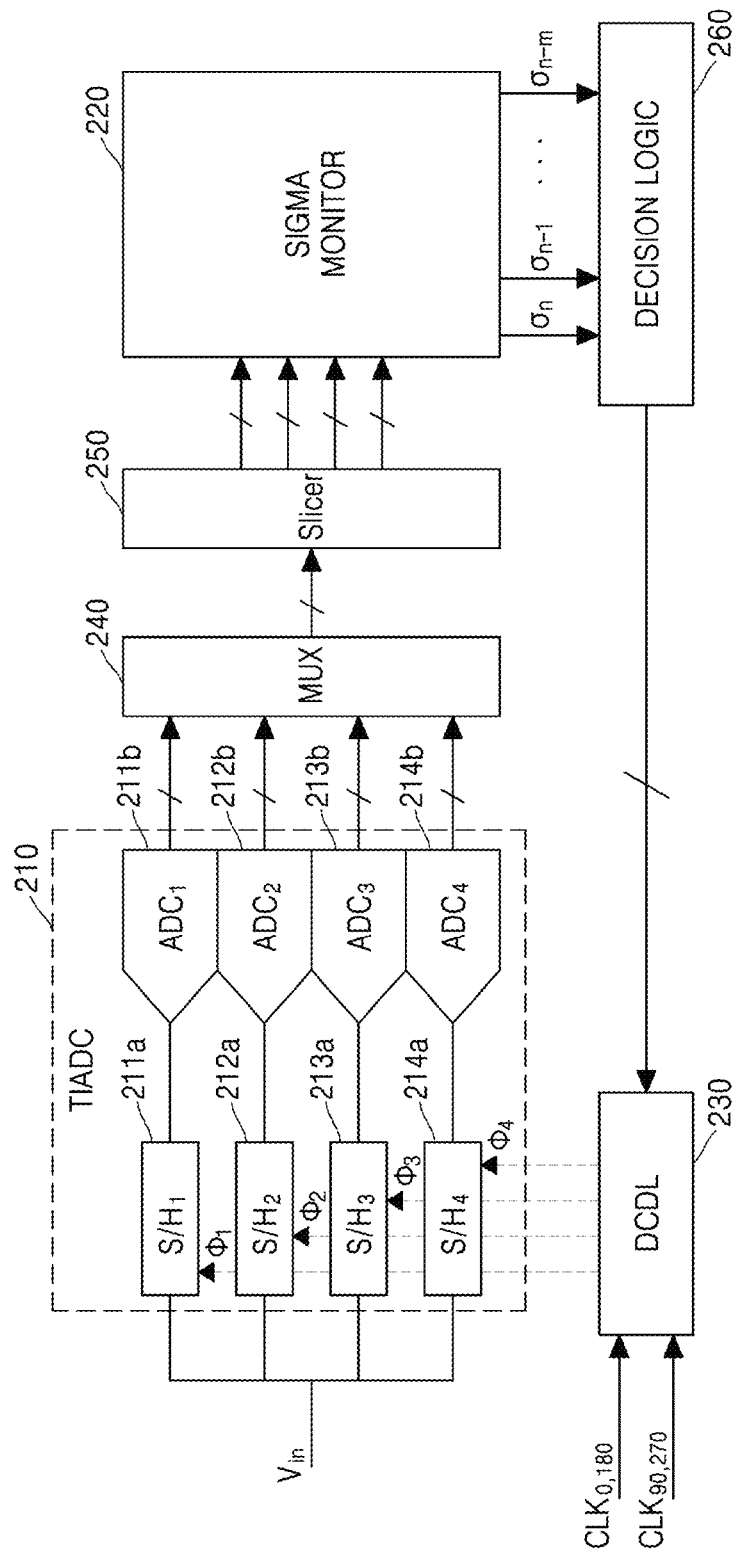
FIG. 8 is a diagram showing an example of a timing calibration device according to some embodiments.

FIG. 8 is a diagram showing an example of a timing calibration device according to some embodiments. FIG. 8 may be described with reference to FIGS. 2 and 3.

Referring to FIG. 8, a timing calibration device 700 may include the TIADC 210, the MUX 240, the slicer 250, the sigma monitor 220, the decision logic 260, and the DCDL 230.

For example, referring to FIGS. 2 and 3, the timing calibration device 700 may include the analog-to-digital conversion circuit 110, the skew detection circuit 120, and the compensation circuit 130. The analog-to-digital conversion circuit 110 may include the TIADC 210 and the multiplexer MUX 240, the skew detection circuit 120 may include the slicer 250, the sigma monitor 220, and the decision logic 260, and the compensation circuit 130 may include the DCDL 230.

The sigma monitor 220 may calculate a standard deviation for each level of a data signal for each of a plurality of clock signals. The sigma monitor 220 may calculate a total standard deviation of each of the plurality of clock signals. In other words, the sigma monitor 220 may calculate the total standard deviation $\sigma_n$ of a current clock signal as well as total standard deviations $\sigma_{n-1}, \sigma_{n-2}, \ldots, \sigma_{n-m}$ of previous clock signals. The sigma monitor 220 may send a plurality of total standard deviations to the decision logic 260. The decision logic 260 may generate a skew calibration code corresponding to the smallest value from among the plurality of total standard deviations. For example, the decision logic 260 may generate a skew calibration code based on selecting a smallest value from among a first sum ($\sigma_n$), a second sum ($\sigma_{n-1}$), and a third sum ($\sigma_{n-2}$). The DCDL 230 may compensate for the clock signals $CLK_0$, $CLK_{90}$, $CLK_{180}$, and $CLK_{270}$ based on a skew calibration code based on the plurality of total standard deviations.

Figure 9:
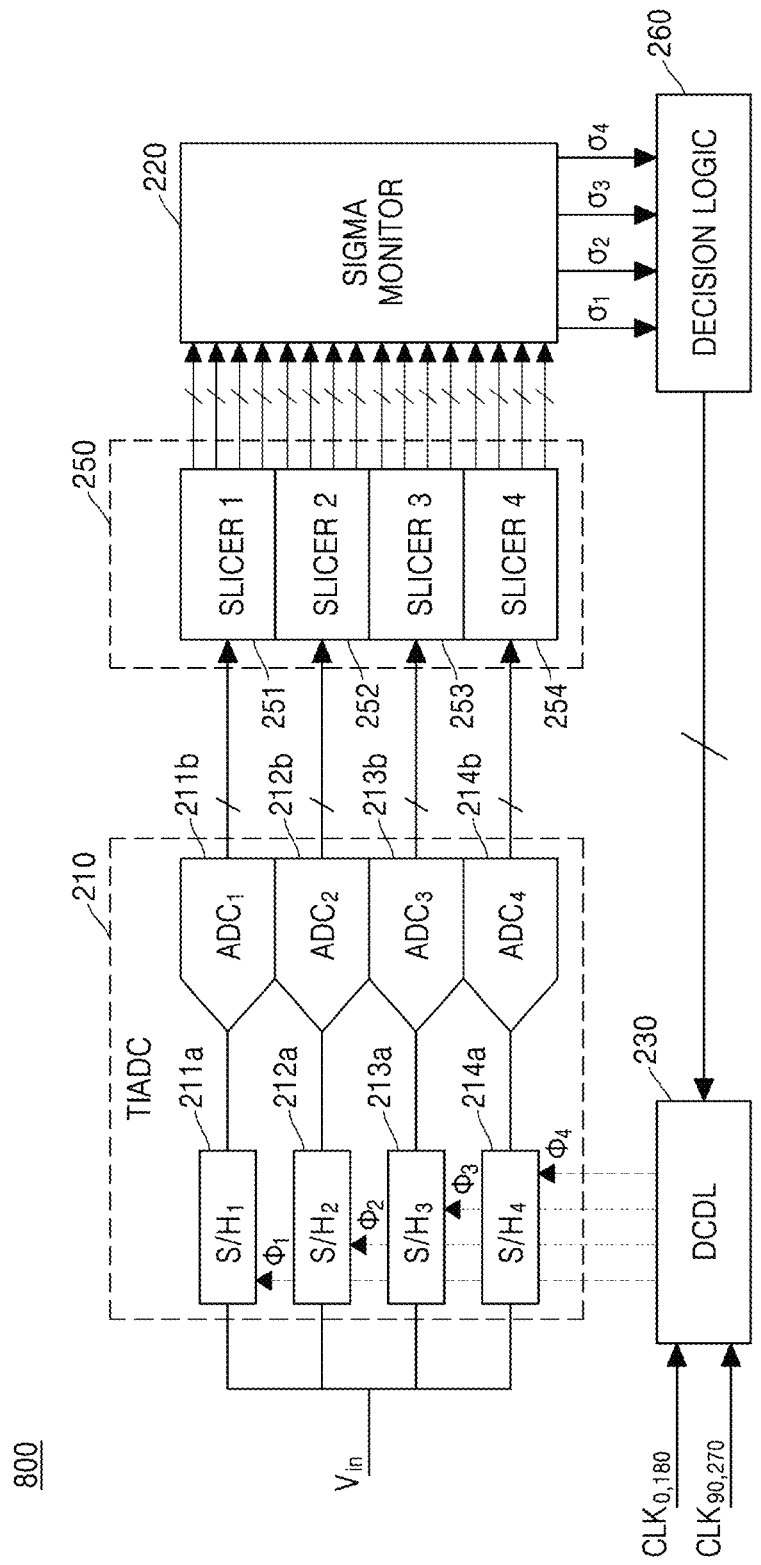
FIG. 9 is a diagram showing an example of a timing calibration device according to some embodiments.

FIG. 9 is a diagram showing an example of a timing calibration device according to some embodiments. FIG. 9 may be described with reference to FIGS. 2 and 3.

Referring to FIG. 9, a timing calibration device 800 may include the TIADC 210, the MUX 240, the slicer 250, the sigma monitor 220, the decision logic 260, and the DCDL 230.

For example, referring to FIGS. 2 and 3, the timing calibration device 800 may include the analog-to-digital conversion circuit 110, the skew detection circuit 120, and the compensation circuit 130. The analog-to-digital conversion circuit 110 may include the TIADC 210, the skew detection circuit 120 may include the slicer 250, the sigma monitor 220, and the decision logic 260, and the compensation circuit 130 may include the DCDL 230.

The slicer 250 may include a plurality of slicers 251, 252, 253, and 254. When the slicer 250 includes the plurality of slicers 251, 252, 253, and 254, the analog-to-digital conversion circuit 110 may not include the MUX 240. A first slicer 251 may receive a digital code from an $ADC_1$ 211b. A second slicer 252 may receive a digital code from an $ADC_2$ 212b. A third slicer 3 253 may receive a digital code from an $ADC_3$ 213b. A fourth slicer 4 254 may receive a digital code from an $ADC_4$ 214b. In other words, each of the plurality of slicers 251, 252, 253, and 254 may receive digital codes from respective ones of the plurality of ADCs 211b, 212b, 213b, and 214b. The plurality of slicers 251, 252, 253, and 254 may each divide a received digital code by levels and may input divided digital code values to the sigma monitor 220. The sigma monitor 220 may monitor a distribution of data for each of the plurality of ADCs 211b, 212b, 213b, and 214b. In other words, the sigma monitor 220 may calculate a total standard deviation σ1 for the ADC1 211b, a total standard deviation σ2 for the ADC2 212b, a total standard deviation σ3 for the ADC3 213b, and a total standard deviation σ4 for the ADC4 214b. In this case, the skew detection circuit 120 may detect a clock skew mismatch for each channel of each of the ADCs 211b, 212b, 213b, and 214b. The decision logic 260 may receive total standard deviations σ1, σ2, σ3, and σ4 of the respective ADCs 211b, 212b, 213b, and 214b of the current clock signal. The decision logic 260 may receive total standard deviations of the respective ADCs 211b, 212b, 213b, and 214b of a previous clock signal. The decision logic 260 may compare the total standard deviation of the current clock signal with the total standard deviation of the previous clock signal and generate a skew calibration code corresponding to a smaller value, for each of the ADCs 211b, 212b, 213b, and 214b. The DCDL 230 may compensate for the clock signals $CLK_0$, $CLK_{90}$, $CLK_{180}$, and $CLK_{270}$ based on skew calibration codes for the ADCs 211b, 212b, 213b, and 214b.

Figure 10:
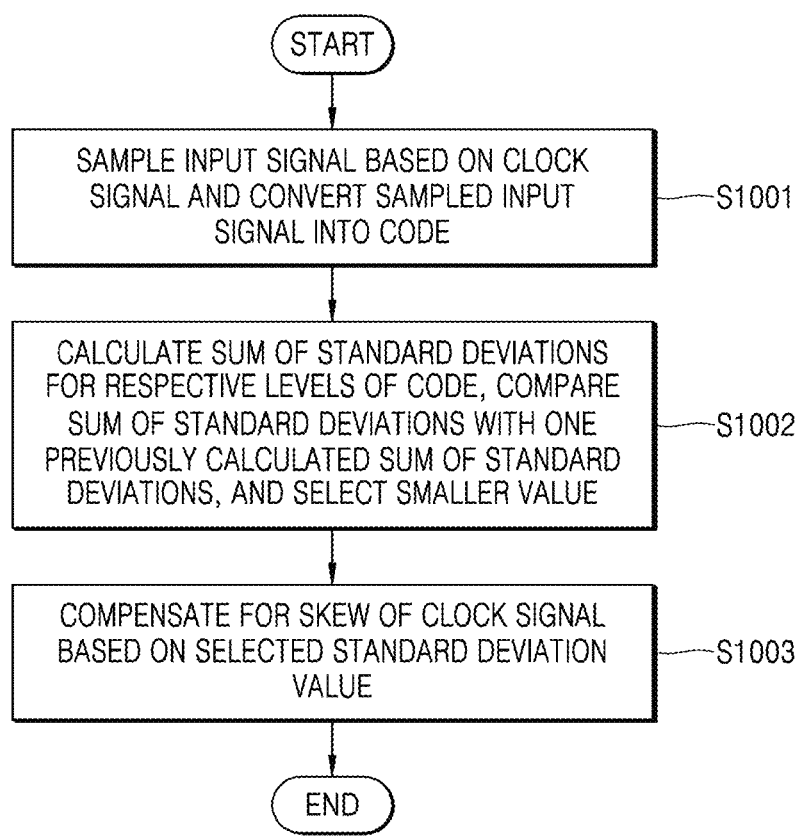
FIG. 10 is a diagram showing an example of a timing calibration procedure according to some embodiments.

FIG. 10 is a diagram showing an example of a timing calibration procedure according to some embodiments. FIG. 10 may be described with reference to FIGS. 2 and 3.

Referring to FIG. 10, in operation S1001, the TIADC 210 may sample an input signal based on a clock signal and may convert a sampled input signal into a digital code.

In operation S1002, the skew detection circuit 120 may calculate standard deviations for respective levels of the digital code and may sum all of the standard deviations of the respective levels. The skew detection circuit 120 may compare the sum of standard deviations with a previously calculated sum of standard deviations and may select a smaller value. The skew detection circuit 120 may determine a parameter related to skew calibration corresponding to the selected value. For example, the skew detection circuit 120 may generate a skew calibration code corresponding to the selected value. The skew detection circuit 120 may transmit a generated skew calibration code to the compensation circuit 130.

In operation S1003, the compensation circuit 130 may compensate for a skew of a clock signal based on the selected standard deviation value. For example, the compensation circuit 130 may receive parameters related to skew calibration from the skew detection circuit 120 and delay a clock signal based on the parameters related to skew calibration. The compensation circuit 130 may receive the generated skew calibration code from the skew detection circuit 120 and may delay a clock signal based on the skew calibration code.

In another example, the compensation circuit 130 may receive parameters related to skew calibration from the skew detection circuit 120 and may perform interpolation based on the parameters related to skew calibration.

Figure 11:
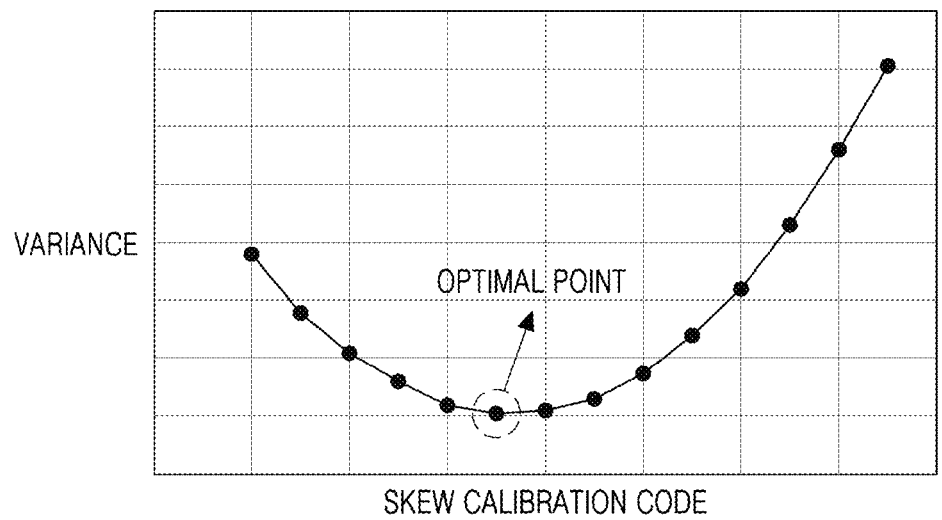
FIG. 11 is a diagram showing a relationship between a skew calibration code and a variance according to some embodiments.

FIG. 11 is a diagram showing a relationship between a skew calibration code and a variance according to some embodiments. FIG. 11 may be described with reference to FIGS. 2, 3, and 4.

Referring to FIG. 11, the skew detection circuit 120, the sigma monitor 220, and the variance monitor 270 may generate parameters related to skew calibration corresponding to a value having the smallest standard deviation or variance. For example, the skew detection circuit 120, the sigma monitor 220, and the variance monitor 270 may generate a skew calibration code corresponding to a value having the smallest standard deviation. The compensation circuit 130, the DCDL 230, the phase interpolator 280, and so on may adjust the phase of a clock signal based on the parameters related to skew calibration. For example, the compensation circuit 130, the DCDL 230, and the phase interpolator 280 may adjust the phase of a clock signal based on a skew calibration code.

Figure 12A:
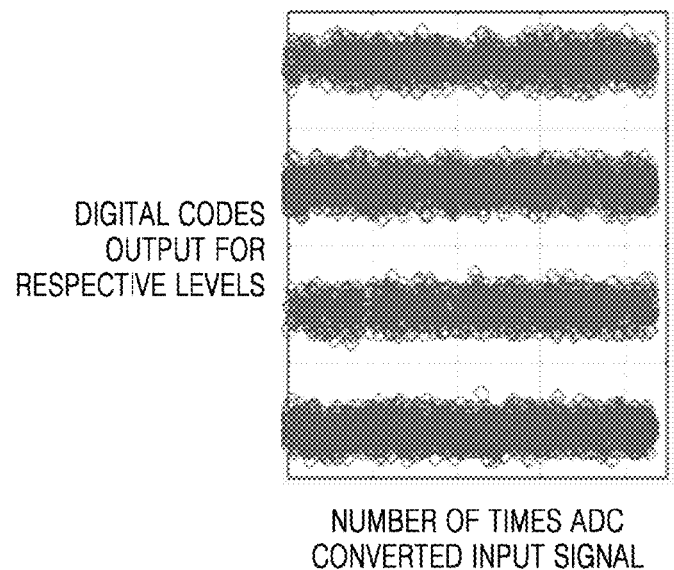
FIG. 12A is a diagram showing output data distribution of a TIADC when a clock skew is adjusted according to some embodiments.
Figure 12B:
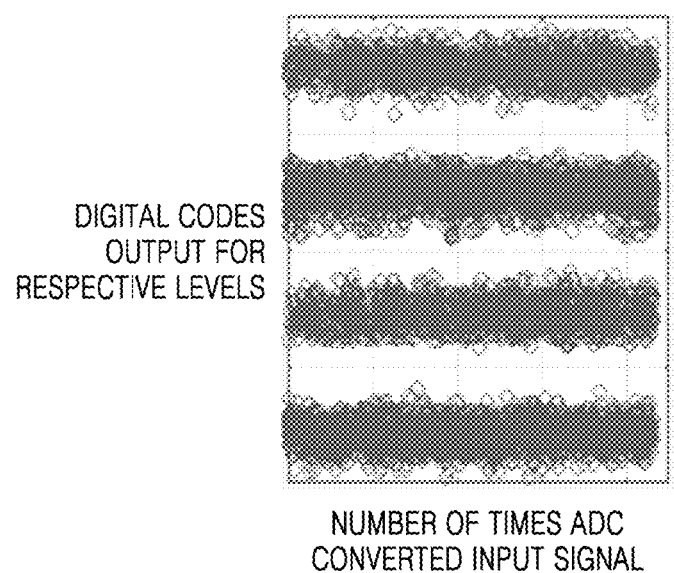
FIG. 12B is a diagram showing output data distribution of a TIADC when a clock skew exists.

FIG. 12A is a diagram showing output data distribution of a TIADC when a clock skew is adjusted according to an embodiment, and FIG. 12B is a diagram showing output data distribution of a TIADC when a clock skew exists and is not adjusted. FIGS. 12A and 12B may be described with reference to FIG. 4.

Referring to FIG. 12A, the x-axis represents the number of times the TIADC 210 converted an input signal into a digital code. The y-axis represents the distribution of data output by the TIADC 210 by level. FIG. 12A shows output data according to an example of PAM-4 signaling, and the level of output data may vary according to signaling. FIG. 12A shows output data distribution when the timing calibration device 300 adjusts the clock skew of the TIADC 210 according to an embodiment, and FIG. 12B shows the output data distribution of the TIADC 210 when a clock skew exists and is not adjusted. It may be seen that, when a clock skew is adjusted (as in FIG. 12A), output data may be more densely distributed at the center of each level for each level as compared to the case (as in FIG. 12B) where a clock skew is not adjusted. Therefore, clock mismatch of the TIADC 210 may be reduced and performance thereof may be improved.

While the inventive concepts of the present disclosure have been particularly shown and described with reference to some examples of embodiments thereof, it will be understood that various changes in form and details may be made therein without departing from the scope of the following claims.

What is claimed is:

1. An apparatus comprising:
   an analog-to-digital conversion circuit configured to sample an input signal based on a clock signal and configured to convert the sampled input signal into a digital code;
   a skew detection circuit configured to receive the digital code from the analog-to-digital conversion circuit, calculate a first sum of standard deviations for respective levels of the digital code, compare the first sum of the standard deviations with a previously calculated second sum of standard deviations, and select a smaller value from among the first sum and the second sum; and
   a compensation circuit configured to compensate for a skew of the clock signal based on the selected smaller value from among the first sum and the second sum.

2. The apparatus of claim 1, wherein the compensation circuit is further configured to compensate for the skew by delaying the clock signal.

3. The apparatus of claim 1, wherein the compensation circuit is further configured to compensate for the skew by performing interpolation with respect to the clock signal.

4. The apparatus of claim 1, further comprising:
   a multiplexer configured to receive the digital code from the analog-to-digital conversion circuit and serialize the digital code; and
   a slicer configured to receive the serialized digital code from the multiplexer, divide the serialized digital code by levels, and transmit a level-divided digital code to the skew detection circuit.

5. The apparatus of claim 1, wherein the analog-to-digital conversion circuit comprises a plurality of analog-to-digital converters (ADCs), and
   wherein each of the plurality of ADCs is connected to a respective slicer.

6. The apparatus of claim 5, wherein the slicers to which the plurality of ADCs are respectively connected are configured to receive a digital code from the respective one of the plurality of ADCs, divide the received digital code by levels, and transmit a level-divided digital code to the skew detection circuit.

7. The apparatus of claim 1, wherein the skew detection circuit is further configured to compare the first sum of standard deviations for respective levels of the digital code with a previously calculated third sum of standard deviations and select a smallest value from among the first sum, second sum, and third sum.

8. An apparatus comprising:
   an analog-to-digital conversion circuit configured to sample an input signal based on a clock signal and convert the sampled input signal into a digital code;
   a skew detection circuit configured to receive the digital code from the analog-to-digital conversion circuit, calculate a first sum of variances for respective levels of the digital code, compare the first sum of the variances with a previously calculated second sum of variances, and select a smaller value from among the first sum and the second sum; and
   a compensation circuit configured to compensate for a skew of the clock signal based on a selected smaller value from among the first sum and the second sum.

9. The apparatus of claim 8, wherein the compensation circuit is further configured to compensate for the skew by delaying the clock signal.

10. The apparatus of claim 8, wherein the compensation circuit is further configured to compensate for the skew by performing interpolation with respect to the clock signal.

11. The apparatus of claim 8, further comprising:
    a multiplexer configured to receive the digital code from the analog-to-digital conversion circuit and serialize the digital code; and
    a slicer configured to receive the serialized digital code from the multiplexer, divide the serialized digital code by levels, and transmit a level-divided digital code to the skew detection circuit.

12. The apparatus of claim 8, wherein the analog-to-digital conversion circuit comprises a plurality of analog-to-digital converters (ADCs), and
    wherein each of the plurality of ADCs is connected to a respective slicer.

13. The apparatus of claim 12, wherein the slicers to which the plurality of ADCs are respectively connected are configured to receive a digital code from the respective one of the plurality of ADCs, divide the received digital code by levels, and transmit a level-divided digital code to the skew detection circuit.

14. The apparatus of claim 8, wherein the skew detection circuit is further configured to compare the first sum of variances for respective levels of the digital code with a previously calculated third sum of a plurality of variances and select a smallest value from among the first sum, second sum, and third sum.

15. An apparatus comprising:
    a time interleaved analog-to-digital converter (TIADC) comprising at least one switch that is configured to sample an input signal based on a clock signal and one or more analog-to-digital converter (ADC) that is configured to convert the sampled input signal into a digital code;
    a sigma monitor configured to calculate a first sum of standard deviations for respective levels of the digital code;
    a decision logic configured to receive the sum of the standard deviations from the sigma monitor, compare the first sum of the standard deviations with a previously calculated second sum of standard deviations, and select a smaller value from among the first sum and the second sum; and
    a compensation circuit configured to compensate for a skew of the clock signal based on a selected smaller value from among the first sum and the second sum.

16. The apparatus of claim 15, wherein the compensation circuit is further configured to compensate for the skew by delaying the clock signal.

17. The apparatus of claim 15, wherein the compensation circuit is further configured to compensate for the skew by performing interpolation with respect to the clock signal.

18. The apparatus of claim 15, further comprising:
    a multiplexer configured to receive the digital code from the TIADC and serialize the digital code; and
    a slicer configured to receive the serialized digital code from the multiplexer, divide the serialized digital code by levels, and transmit a level-divided digital code to the sigma monitor.

19. The apparatus of claim 15, wherein each of the one or more ADCs is connected to a respective slicer, and
    wherein each of the slicers to which the one or more ADCs are respectively connected is configured to receive a digital code from the ADC connected respectively thereto, divide the received digital code by levels, and transmit a level-divided digital code to the sigma monitor.

20. The apparatus of claim 15, wherein the sigma monitor is further configured to transmit the first sum of standard deviations for respective levels of the digital code and a previously calculated third sum of a plurality of standard deviations to the decision logic, and the decision logic is further configured to select a smallest value from among the first sum, second sum, and third sum.

* * * * *